W. F. TWOMBLY.
BRUSH AND TIMBER CUTTING DEVICE.
APPLICATION FILED JUNE 30, 1916.
1,225,531. Patented May 8, 1917.
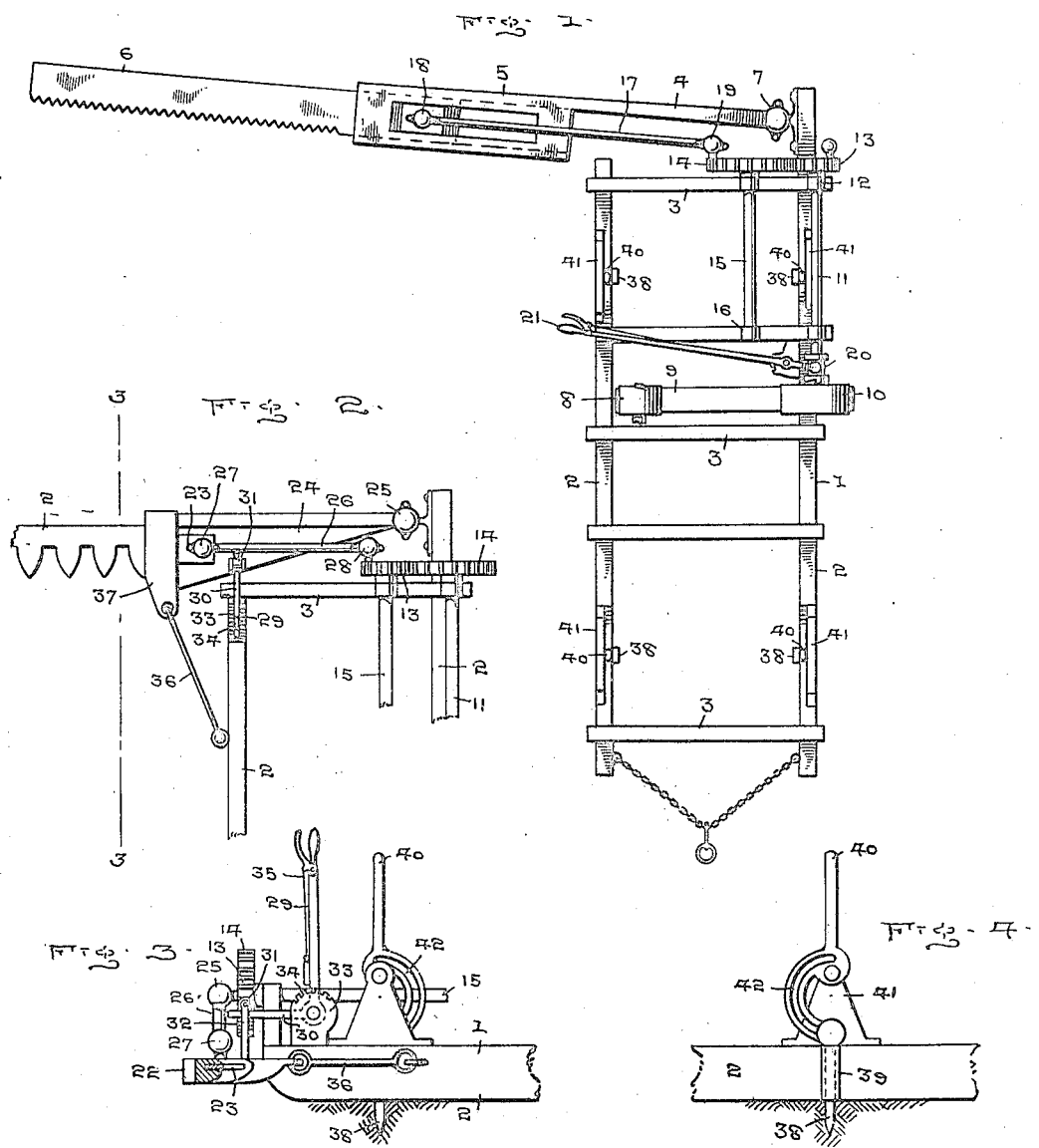
W. F. Twombly, Inventor
By W. J. Fitzgerald & Co., Attorney

UNITED STATES PATENT OFFICE.

WILLIAM FREDRICK TWOMBLY, OF ORIENT, IOWA.

BRUSH AND TIMBER CUTTING DEVICE.

1,225,531.  Specification of Letters Patent.  Patented May 8, 1917.

Application filed June 30, 1916. Serial No. 106,936.

*To all whom it may concern:*

Be it known that I, WILLIAM FREDRICK TWOMBLY, a citizen of the United States, residing at Orient, in the county of Adair and State of Iowa, have invented certain new and useful Improvements in Brush and Timber Cutting Devices; and I do hereby declare the following to be a full, clear, and exact description of the invention, such as will enable others skilled in the art to which it appertains to make and use the same.

My invention relates to new and useful improvements in brush and timber cutting devices, and my object is to provide a saw structure and means for operating the same.

A further object is to provide a sled structure for transporting the saw structure and its operating means from place to place.

A further object is to provide means for holding the sled structure against skidding.

A further object is to provide a cutting device to be substituted for the saw structure for cutting brush, weeds, and the like.

And a further object is to provide means for changing the stroke of the pitman adapting the same for use in connection with the saw structure or cutting device.

Other objects and advantages will be hereinafter set forth and more particularly pointed out in the accompanying specification.

In the accompanying drawings which are made a part of this application,

Figure 1 is a top plan view of the saw structure and carrying device therefor.

Fig. 2 is a detail plan view of a portion of the sled structure showing the manner of attaching the brush cutting device thereto.

Fig. 3 is a sectional view, as seen on line 3—3 of Fig. 2, and

Fig. 4 is an enlarged elevation of a portion of the sled structure showing the manner of anchoring the same against skidding.

Referring to the drawings in which similar reference numerals designate corresponding parts throughout the several views, 1 indicates a sled structure comprising side rails or runners 2 and cross bars 3 employed for holding the side rails in spaced relation.

Attached to the inner face of one of the side rails 2, which is made longer than the opposite side rail, is an arm 4 of a frame 5, said frame forming a guide for a saw 6, the arm 4 being attached to the side rails 2 by means of a ball and socket joint 7 so that said frame and saw carried thereby may have free lateral and vertical movement.

The saw 6 is operated from any suitable form of engine (not shown) carried by the sled structure 1 at a point between its ends, the power from the motor being transmitted to the saw from a pulley 8 of the motor through a belt 9, to a pulley 10 mounted upon a shaft 11, said shaft 11 being in turn rotatably mounted in suitable bearings 12 on certain of the cross bars 3. A gear 13 is attached to the opposite end of the shaft 11, and meshing with said gear 13 is a gear 14 mounted upon one end of a shaft 15, which shaft is likewise rotatably mounted in bearings 16 upon certain of the cross bars 3, the gear 14 being greater in diameter than the gear 13 to give the proper stroke to the saw 6.

The saw 6 is operated from the gear 14 through the medium of a pitman 17, the ends of the pitman being attached respectively to the saw and gear 14 through the medium of ball and socket joints 18 and 19, whereby the saw will be positively driven at whatever angle the same may be disposed. The pulley 10 is preferably loosely mounted upon the shaft 11 so that in order to cause the motor to drive the shaft 11, a clutch 20 is slidably mounted upon the shaft 11 but fixed thereon to cause the shaft to rotate, said clutch being thrown into or out of gear with the clutch face of the pulley 10 through the medium of a lever 21.

This form of device is used for sawing timber and is principally designed for clearing land of shrubbery where the bushes are too large to be cut with an ordinary sickle bar, but when the under growth or shrubbery consists of small sprouts or weeds, that form of device shown in Fig. 2 is employed which consists of a sickle bar 22 having a sickle 23 coöperating therewith, the arm 24 of the sickle bar being attached to the side rail 2 with a ball and socket joint 25, while the pitman 26, employed for reciprocating the sickle 23, is attached at its ends with ball and socket members 27 and 28.

When this form of device is used, the gears 13 and 14 are reversed with respect to the shafts 11 and 15, thereby greatly increasing the stroke of the pitman 26 and the sickle attached thereto. In order to tilt the sickle bar a lever 29 is mounted upon one of the side rails 2, said lever having an extension 30 which engages a roller 31 carried by a standard 32 attached to the sickle bar 22, the supporting ear 33 for the lever having a rack 34 with which engages a latch 35 carried by the lever, and by swinging the lever forwardly or rearwardly the sickle bar will be elevated or lowered, the latch mechanism holding the lever in its adjusted position.

In this form of device, the sled structure is pulled forwardly by a draft animal, or otherwise, and the sickle bar is held in proper alinement by means of a link 36, one end of which is pivoted to one of the side rails, and the opposite end to a shoe 37 at the inner end of the sickle bar.

In order to prevent the sled from skidding, as when being drawn over snow covered ground or ice, I provide anchoring prongs 38 which extend through sockets 39 on the side rails 2, the upper ends of said prongs being attached to levers 40 pivotally mounted on standards 41, said levers having cam slots 42 in their lower ends so arranged that when the levers are in a vertical position, the prongs will be forced downwardly into the surface over which the sled structure passes, but when in a horizontal position will elevate the prong to a point above the surface over which the sled structure passes.

This device can be very cheaply constructed and can be used for cutting small or large timber or for cutting briers, sprouts, brush, and the like, and by attaching a draft animal to the sled structure, a large area can be gone over in a short length of time.

It will likewise be seen that the device can be used over either smooth or uneven surfaces, owing to the manner of flexibly connecting the cutting parts to the sled structure.

And it will likewise be seen that by reversing the gears upon the shafts, the speed of the pitman may be increased or decreased as when using the pitman in connection with the sickle or saw.

I claim:

1. In a cutting device of the class described, the combination with a sled structure, of a power driven shaft rotatably mounted thereon, a second shaft rotatably mounted on the sled structure, intermeshing gears attached to said shafts, one of said gears being larger than the other, a frame, an arm extending from said frame, a ball and socket joint connecting said arm to the sled structure, a saw reciprocatingly mounted in said frame, a pitman, a ball and socket joint at each end of said pitman connecting the ends of the pitman to said saw and one of said gears respectively, a clutch mechanism on the power driven shaft, a lever adapted to connect or disconnect the clutch mechanism, and means to hold the sled structure against skidding movement.

2. The combination with a sled, of an arm, a ball and socket joint connecting said arm with the sled, a guide frame carried by the outer end of said arm, a cutter bar reciprocatingly mounted in said frame, a power driven gear mounted upon the sled, a pitman, and ball and socket joints connecting the opposite ends of said pitman with the cutter bar and the power driven gear respectively, said ball and socket joints of the arm and pitman permitting the cutter bar to be moved vertically and laterally with respect to the sled.

In testimony whereof I have signed my name to this specification in the presence of two subscribing witnesses.

WILLIAM FREDRICK TWOMBLY.

Witnesses:
J. E. WILSON,
CHAS. E. CLARK.

Copies of this patent may be obtained for five cents each, by addressing the "Commissioner of Patents, Washington, D. C."